US009811495B2

(12) United States Patent
Huang et al.

(10) Patent No.: US 9,811,495 B2
(45) Date of Patent: Nov. 7, 2017

(54) ARBITRATION SIGNALING WITHIN A MULTIMEDIA HIGH DEFINITION LINK (MHL 3) DEVICE

(71) Applicant: Silicon Image, Inc., Sunnyvale, CA (US)

(72) Inventors: Jiong Huang, Sunnyvale, CA (US); Lei Ming, San Jose, CA (US); Gyudong Kim, Sunnyvale, CA (US); Young Il Kim, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 512 days.

(21) Appl. No.: 14/470,750

(22) Filed: Aug. 27, 2014

(65) Prior Publication Data
US 2016/0062937 A1    Mar. 3, 2016

(51) Int. Cl.
*H04B 1/44* (2006.01)
*G06F 13/40* (2006.01)
*G06F 13/362* (2006.01)

(52) U.S. Cl.
CPC ........ *G06F 13/4031* (2013.01); *G06F 13/362* (2013.01)

(58) Field of Classification Search
CPC ..... H04J 3/00; H04L 5/14; H04L 5/16; H04L 5/1461; H04L 5/1453
See application file for complete search history.

(56) References Cited

U.S. PATENT DOCUMENTS

| 5,546,543 A * | 8/1996 | Yang | G06F 13/362 709/234 |
|---|---|---|---|
| 2009/0093262 A1* | 4/2009 | Gao | H04W 68/00 455/458 |
| 2010/0183004 A1* | 7/2010 | Kobayashi | G06F 13/385 370/389 |
| 2011/0182216 A1* | 7/2011 | Ono | H04L 5/16 370/282 |
| 2012/0173769 A1* | 7/2012 | Loo | G06F 3/1454 710/14 |
| 2015/0189587 A1* | 7/2015 | Bennett | H04W 36/08 370/277 |
| 2016/0062937 A1* | 3/2016 | Huang | G06F 13/362 710/116 |

(Continued)

*Primary Examiner* — Andrew Chriss
*Assistant Examiner* — Kenan Cehic
(74) *Attorney, Agent, or Firm* — Fenwick & West LLP

(57) ABSTRACT

An apparatus for interfacing with a multimedia communication link comprises a half-duplex translation layer circuit operating in half-duplex and a full-duplex link layer circuit to communicate over a control bus of the multimedia communication link in full duplex. The apparatus further comprises an arbitration circuit communicatively coupled between the half-duplex translation layer circuit and the full-duplex link layer circuit, the arbitration circuit to control data flow between the half-duplex translation layer circuit and the full-duplex link layer circuit. The arbitration circuit provides interface and signaling rules for transmitting packets from the half-duplex translation layer circuit to the full-duplex link layer circuit, receiving packets via the full-duplex link layer circuit at the half-duplex translation layer circuit, and resolving conflict arising due to bidirectional data flow at the arbitration logic.

20 Claims, 8 Drawing Sheets

(56) References Cited

U.S. PATENT DOCUMENTS

2016/0134415 A1* 5/2016 Chen ................... H04L 5/16
                                                    370/277
2017/0141867 A1* 5/2017 Choi ................. H04J 11/004

* cited by examiner

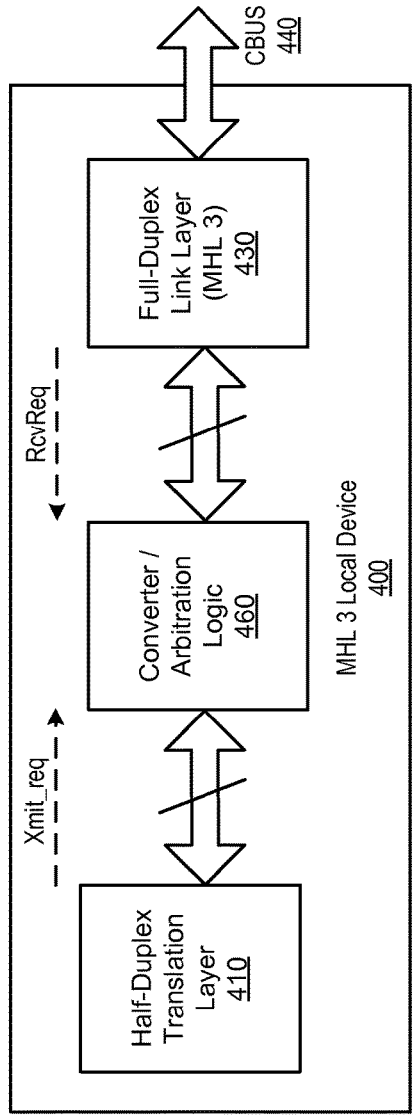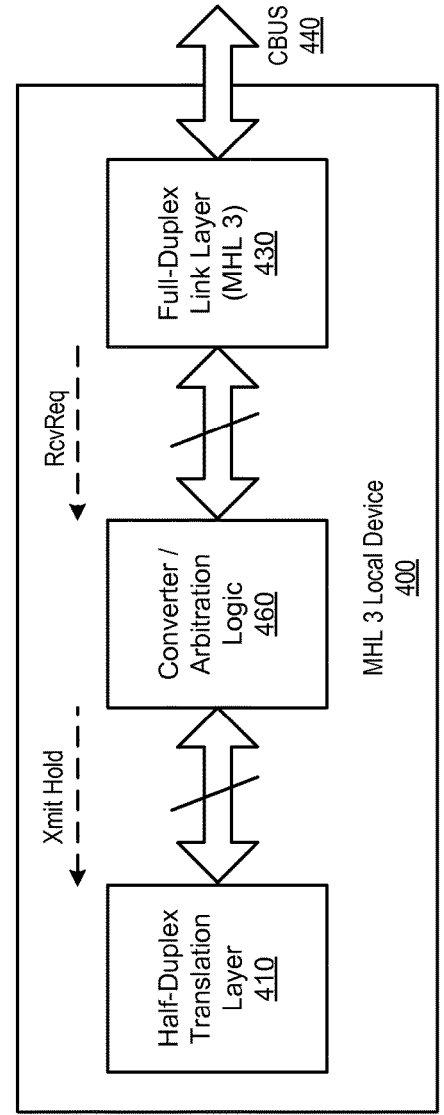

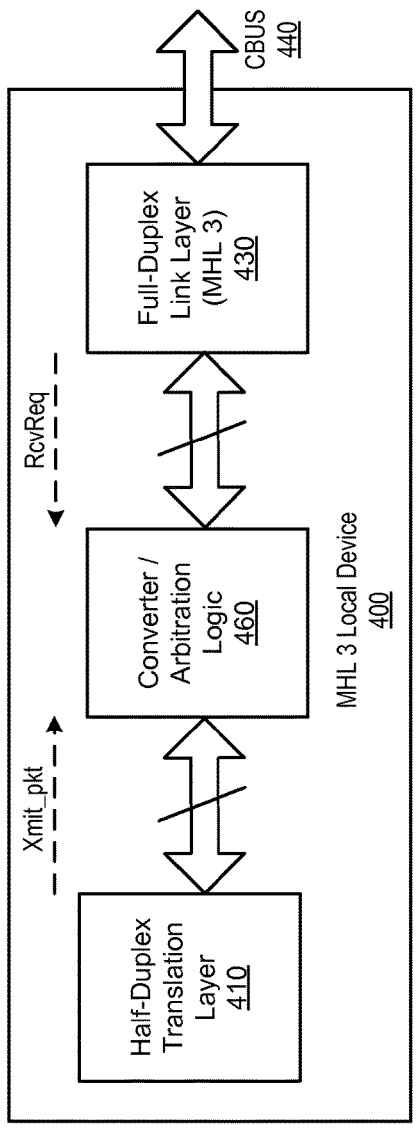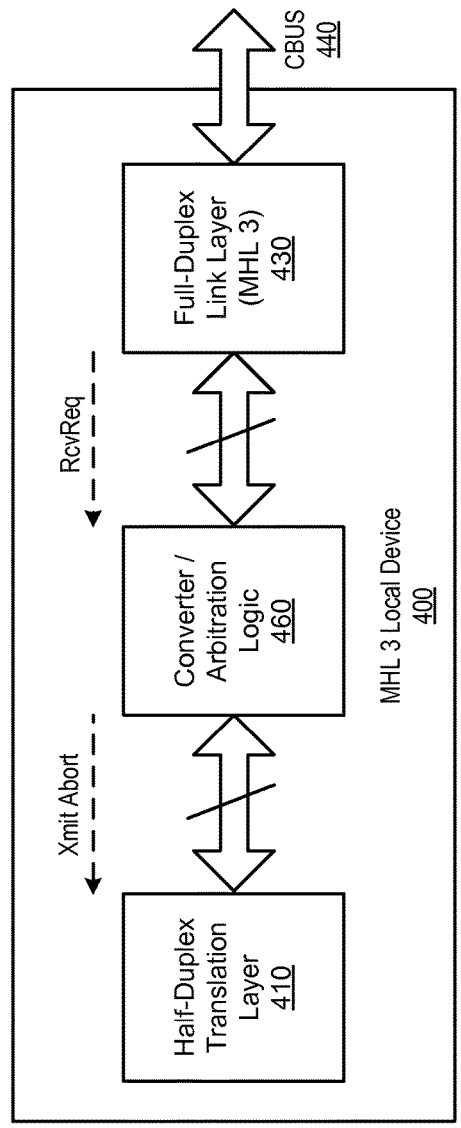

ARBITRATION SIGNALING WITHIN A MULTIMEDIA HIGH DEFINITION LINK (MHL 3) DEVICE

TECHNICAL FIELD

The disclosed embodiments relate generally to Multimedia High Definition Link (MHL) standards, and more specifically to methods and devices that provide backward compatibility between MHL 3 devices and legacy MHL software.

BACKGROUND

Under the legacy MHL 1/2 protocol, a local MHL device communicates with a peer MHL device using a legacy MHL (MHL 1/MHL 2) link. The legacy link, in turn, has a half-duplex legacy control bus that enables exchange of control packets between the local and peer MHL devices. Thus, in the legacy MHL 1/2 configuration, the local MHL device, the peer legacy device, as well as the legacy MHL control bus are all configured to operate in half-duplex.

Under the MHL 3 protocol, a local MHL 3 device communicates with a peer MHL 3 device using an MHL 3 link. The MHL 3 link, in turn, has a full-duplex control bus that supports concurrent bi-directional exchange of control packets between the local and peer MHL devices. Thus, a link layer of an MHL 3 device that communicates with the full-duplex MHL 3 control bus operates in full-duplex. However, a full-duplex link layer is not typically compatible with legacy components of a MHL device, such as translation layer circuitry and software, that were originally designed to communicate over a half-duplex link layer. This incompatibility can cause an expensive redesign of these components to ensure compatibility with a half-duplex link layer.

SUMMARY

Accordingly, some embodiments provide a device for interfacing with a multimedia communication link having a multimedia bus and a control bus. The device includes a full-duplex link layer circuit to communicate, in full duplex, over the full-duplex control bus of the multimedia communication link. The device further comprises a half-duplex translation layer circuit to transmit and receive data through an interface in half-duplex and communicatively coupled to the full-duplex link layer. The device further comprises an arbitration circuit (alternatively referred to herein as a converter or arbitration logic) communicatively coupled between the interface of the half-duplex translation layer circuit and the full-duplex link layer circuit. The arbitration circuit is configured to control data flow between the half-duplex translation layer circuit and the full-duplex link layer circuit. In some embodiments, the arbitration circuit is configured to provide interface and signaling rules for transmitting packets from the half-duplex translation layer to the full-duplex link layer, for receiving packets via the full-duplex link layer at the half-duplex translation layer, and for resolving conflict arising due to bidirectional data flow at the arbitration logic.

In some embodiments, the arbitration circuit receives a transmission request from the half-duplex translation layer circuit and a receive request from the full-duplex link layer circuit. Responsive to the transmission request and the receive request, the arbitration circuit grants the receive request and holds the transmission request until a receive transaction associated with the receive request is completed.

In some embodiments, the arbitration circuit receives a data receive request while in a data transmission state. Responsive to receiving the data receive request while in the data transmission state, the arbitration circuit aborts the data transmission state and grants the data receive request.

In some embodiments, while the arbitration circuit is in a data transmission state, if the arbitration circuit fails to receive a transmission grant from the full-duplex link layer circuit within a pre-determined period of time, the arbitration circuit generates an interrupt signal causing a reset of protocol states of the full-duplex link layer and/or of the half-duplex translation layer circuit.

In some embodiments, while the arbitration circuit is in a data receiving state, if the arbitration circuit fails to receive a transmission grant from the full-duplex link layer circuit within a pre-determined period of time, the arbitration circuit generates an interrupt signal causing a reset of protocol states of the full-duplex link layer and/or of the half-duplex translation layer circuit.

In some embodiments, while the arbitration circuit is in a data transmission state, if the arbitration circuit fails to receive a handshake signal from a peer device via the full-duplex link layer circuit within a pre-determined period of time, the arbitration circuit generates an interrupt signal possibly requesting further diagnosis at a higher or upper system level.

In some embodiments, the arbitration circuit comprises a state machine that controls flow of data between the half-duplex translation layer circuit and the full-duplex link layer circuit.

In some embodiments, the device further comprises a half-duplex link layer circuit to receive and transmit data over the control bus in half duplex and a multiplexing circuit configured to selectively connect the half-duplex link layer or the arbitration logic to the interface of the half-duplex translation layer circuit based on capabilities of a peer device connected to the control bus.

BRIEF DESCRIPTION OF THE DRAWINGS

FIGS. 5A-5B include block diagrams illustrating a first example of arbitration signaling performed at a local MHL 3 device to resolve conflict arising at the half-duplex translation layer due to bidirectional data flow at arbitration logic or at the full-duplex link layer, according to some embodiments.

FIGS. 6A-6B include block diagrams illustrating a second example of arbitration signaling performed at a local MHL 3 device to resolve conflict arising at the half-duplex translation layer due to bidirectional data flow at the arbitration logic or at the full-duplex link layer, according to some embodiments.

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

Figure 1:
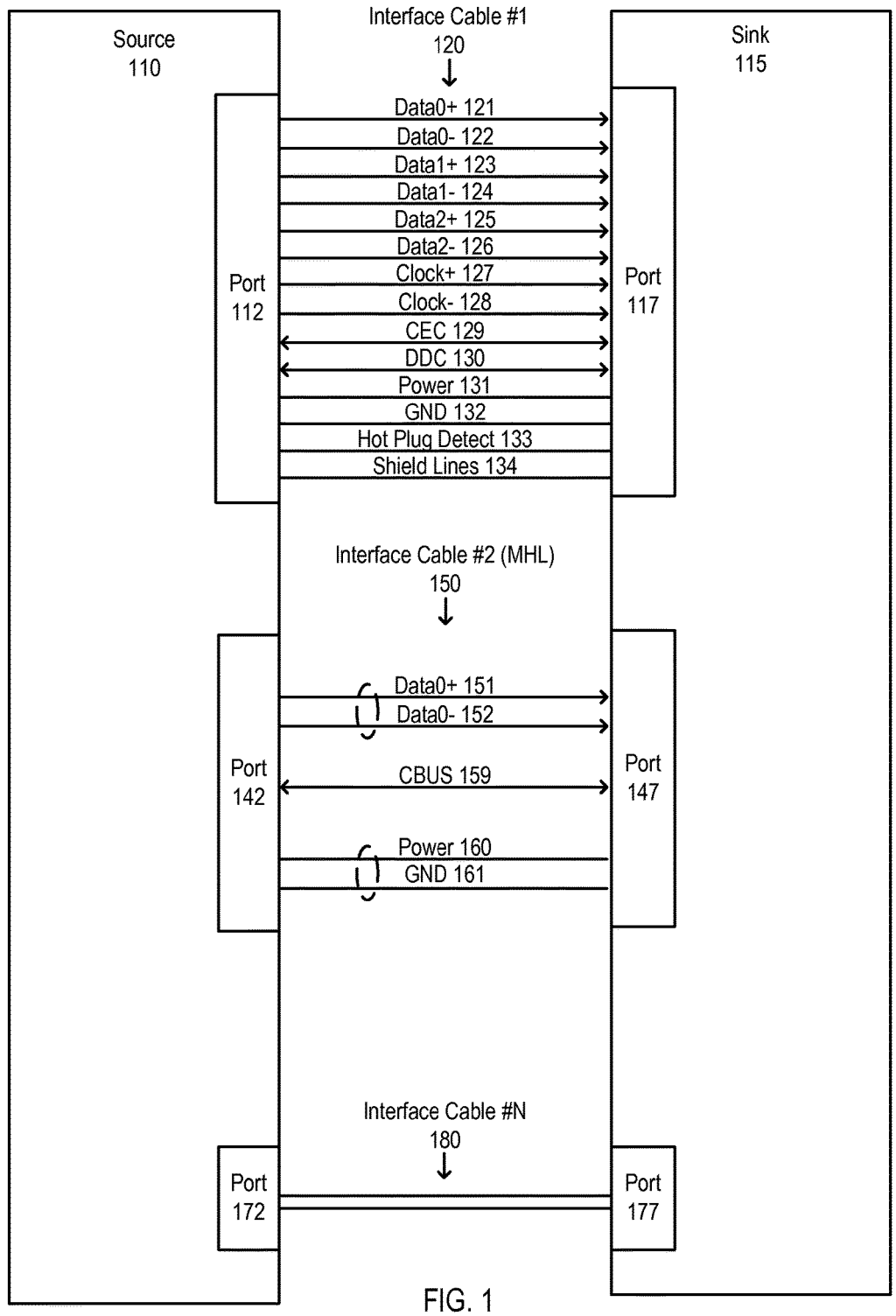
FIG. 1 includes a high-level block diagram of a system for data communications, according to some embodiments.

FIG. 1 is a high-level block diagram of a system 100 for data communications, according to one embodiment. The system 100 includes a source device 110 communicating with a sink device 115 through one or more interface cables 120, 150, 180. Source device 110 transmits multimedia data streams (e.g., audio/video streams) to the sink device 115 and also exchanges control data with the sink device 115 through the interface cables 120, 150, 180. In one embodiment, source device 110 and/or sink device 115 may be repeater devices.

Source device 110 includes physical communication ports 112, 142, 172 coupled to the interface cables 120, 150, 180. Sink device 115 also includes physical communication ports 117, 147, 177 coupled to the interface cables 120, 150, 180. Signals exchanged between the source device 110 and the sink device 115 across the interface cables pass through the physical communication ports.

Source device 110 and sink device 115 exchange data using various protocols. In one embodiment, interface cable 120 represents a High Definition Multimedia Interface (HDMI) cable. The HDMI cable 120 supports differential signals transmitted via data0+ line 121, data0− line 122, data1+ line 123, data1− line 124, data2+ line 125, and data2− line 126. The HDMI cable 120 may further include differential clock lines clock+ 127 and clock− 128; Consumer Electronics Control (CEC) control bus 129; Display Data Channel (DDC) bus 130; power 131, ground 132; hot plug detect 133; and four shield lines 844 for the differential signals. In some embodiments, the sink device 115 may utilize the CEC control bus 129 for the transmission of closed loop feedback control data to source device 110.

In one embodiment, interface cable 150 represents a Mobile High-Definition Link (MHL) cable. The MHL cable 150 supports differential signals transmitted, for example, via data0+ line 151, data0− line 152. Data lines 151 and 152 form a multimedia bus for transmission of multimedia data streams from the source device 110 to the sink device 115. In some embodiments of MHL, there may only be a single pair of differential data lines (e.g., 151 and 152). Alternatively, a plurality of differential data lines is provided to enable transmission (e.g., concurrently) of multiple differential signals on the multiple differential data lines. Embedded common mode clocks are transmitted through the differential data lines.

The MHL cable 150 may further include a control bus (CBUS) 159, power 160 and ground 161. The CBUS 159 is a bi-directional bus that carries control information such as discovery data, display identification, configuration data, and remote control commands. CBUS 159 for legacy MHL (MHL 1/2) operates in half duplex mode. On the other hand, CBUS 159 for MHL (MHL 3), alternatively referred to as an enhanced CBUS (eCBUS), operates in full duplex. In some embodiments, the eCBUS is single ended and provides single-ended signaling capability over a single signal wire. Alternatively, the eCBUS is differential ended (between differential lines eCBUS+ and eCBUS−) and provides differential-ended signaling capability over a differential pair of signal wires. An MHL 3 device (referred to herein as a local device) has the capability to interface with another MHL 3 device (referred to herein as a peer device) over a full duplex enhanced CBUS. For example, the source device 110 may be the local device if it is transmitting control information to the sink device 115. Alternatively, the sink device 115 may be the local device if it is transmitting control information to the source device 110.

Additionally, in the event that a local MHL 3 device needs to communicate with a legacy MHL device over a legacy MHL link or to operate with legacy MHL software, the local MHL 3 device has the capability to downgrade to a legacy operational mode from the MHL 3 mode. For example, a local MHL 3 device has the capability to interface with a peer MHL 1/2 device over a half-duplex CBUS.

Embodiments of the present disclosure relate to a system and MHL 3 device architecture for preserving backward compatibility with legacy MHL while allowing reuse of existing circuits and software that were used for legacy MHL. The MHL 3 device is configured to interface with a peer MHL 3 device over an MHL 3 link that includes a full-duplex enhanced control bus (eCBUS), as well as interface with a legacy MHL device over a legacy MHL 1/2 link that includes a half-duplex control bus (CBUS) and with legacy MHL software.

Figure 2:
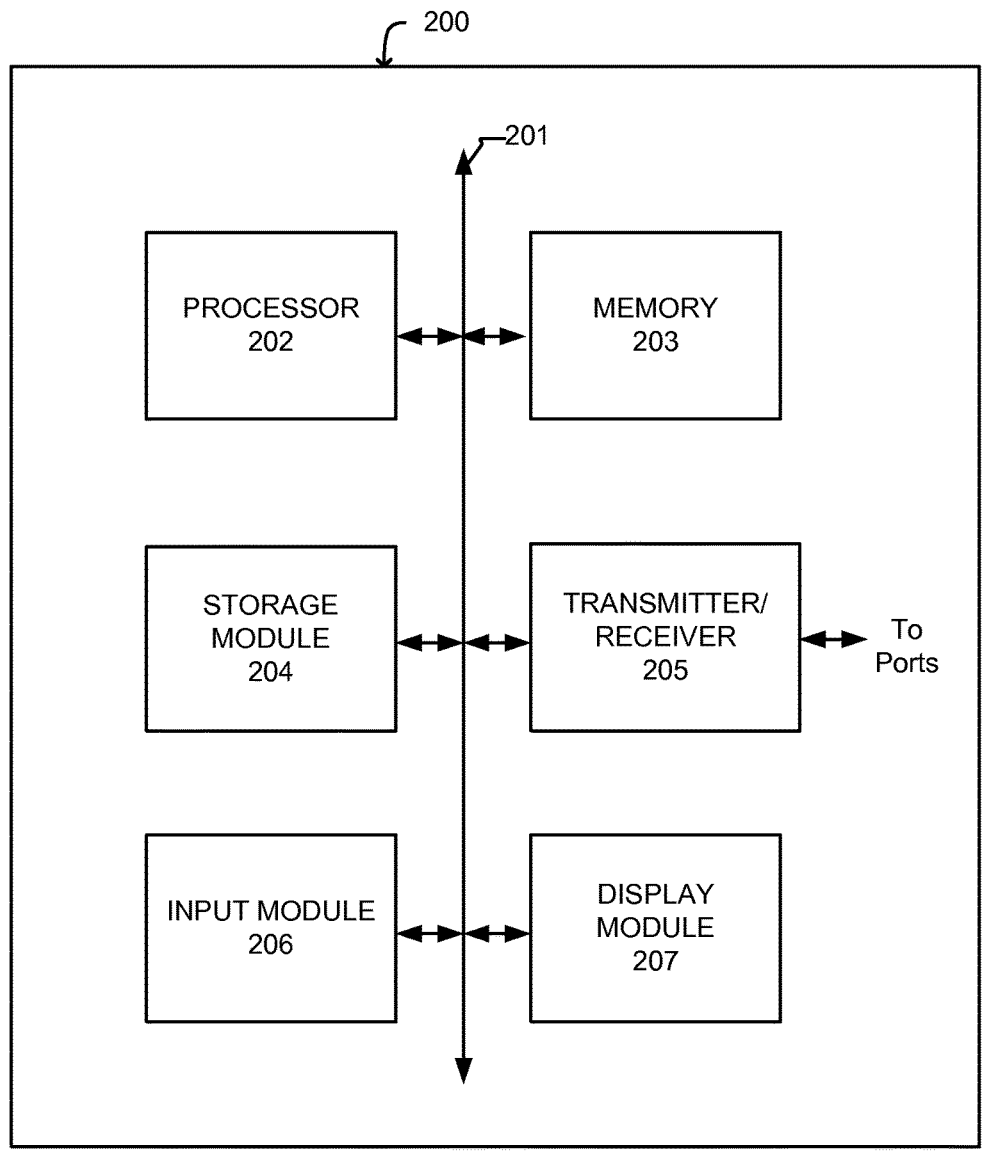
FIG. 2 includes a block diagram of a computing device suitable for use as a source device or sink device of FIG. 1, according to one embodiment.

FIG. 2 is a detailed view of a computing device 200 suitable for use as the source device 110 or sink device 115 from FIG. 1, according to one embodiment. The computing device 200 can be, for example, a cell phone, a television, a laptop, a tablet, etc. The computing device 200 includes components such as a processor 202, a memory 203, a storage module 204, an input module (e.g., keyboard, mouse, and the like) 206, a display module 207 (e.g. liquid crystal display, organic light emitting display, and the like) and a transmitter or receiver 205, exchanging data and control signals with one another through a bus 201.

The storage module 204 is implemented as one or more non-transitory computer readable storage media (e.g., hard disk drive, solid state memory, etc), and stores software instructions that are executed by the processor 202 in conjunction with the memory 203. Operating system software and other application software may also be stored in the storage module 204 to run on the processor 202.

The transmitter or receiver 205 is coupled to the ports for reception or transmission of multimedia data and control data. Multimedia data that is received or transmitted may include video data streams or audio-video data streams, such as HDMI and MHL data. The multimedia data may be encrypted for transmission using an encryption scheme such as HDCP (High-Bandwidth Digital-Content Protection).

In one embodiment, a representation of circuits within the receiver source device 110 or sink device 115 may be stored as data in a non-transitory computer-readable medium (e.g. hard disk drive, flash drive, optical drive). These representations may in the form of, for example, behavioral level descriptions, register transfer level descriptions, logic component level descriptions, transistor level descriptions or layout geometry-level descriptions.

Figure 3:
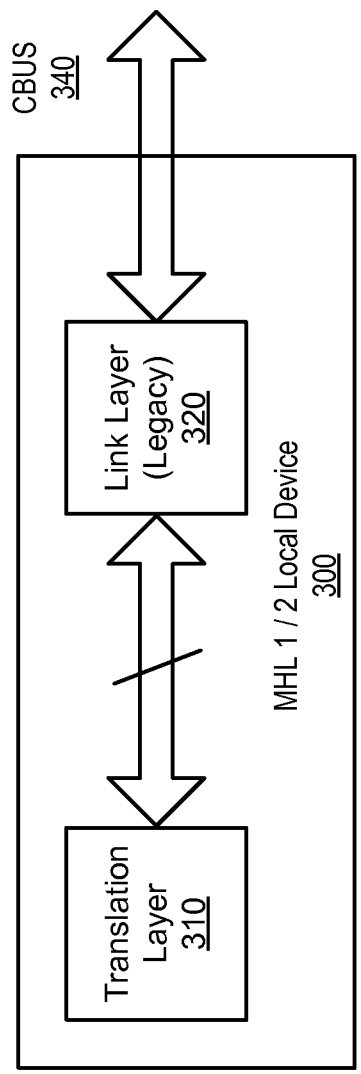
FIG. 3 illustrates a block diagram of a local legacy MHL device configured to interface with a peer legacy MHL device via a legacy MHL (MHL 1/MHL 2) link that includes a half-duplex legacy control bus (CBUS), according to some embodiments.

FIG. 3 illustrates a block diagram of a local legacy MHL device 300 configured to interface with a peer legacy MHL device via a legacy MHL (MHL 1/MHL 2) link.

In some embodiments, the local legacy MHL device 300 is a source device (e.g., source 110 of FIG. 1). In alternative embodiments, the local legacy MHL device 300 is a sink device (e.g., sink 115 of FIG. 1). The local legacy MHL device 300 includes a translation layer 310 and a legacy link layer 320.

The local legacy MHL device 300 communicates with a peer legacy MHL device via a legacy MHL (MHL 1/MHL 2) link. The legacy link, in turn, comprises a half-duplex legacy control bus (CBUS 340) for exchange of control packets between the local and peer devices. In other words, in the configuration described with reference to FIG. 3, the interface cable 150 explained with reference to FIG. 1 supports legacy MHL 1/2 communication protocol and the CBUS 159 is a half-duplex legacy control bus. Thus, in the legacy MHL configuration, the local legacy device 300, the peer legacy device, as well as the legacy control bus are all configured to operate in half-duplex.

The translation layer 310 communicates in half duplex over CBUS 340 and is configured to generate and receive control information. By virtue of being half duplex, the translation layer 310 is configured to perform either one of packet data transmission or packet data receipt at any given time through its internal interface to the link layer 320, but not both concurrently. In other words, the translation layer 310 can support packet data transmission from the local device 300 to a peer device by obtaining a packet from software at the local device 300, processing the packet, and providing the packet to the legacy link layer 320 for further transmission to the peer device. Alternatively, the translation layer 310 can support packet receipt at the local device 300 from a peer device by performing the reverse operations—obtaining a received packet from the legacy link layer 320, processing the packet, and providing the packet to software at the local device 300. However, the translation layer 310 cannot support both packet data transmission and packet data receipt concurrently since it operates in half-duplex.

Similarly, the legacy link layer 320 is also half-duplex. Functions of the link layer include providing link layer protocol commands, link layer flow control, bit timings, and packet timings at the local device 300 for transfer of packet data across the control bus 340. By virtue of being half-duplex, the legacy link layer 320 is configured to perform either one of packet transmission or packet receipt at any given time, but not both concurrently. Thus, since the translation layer 310 and the link layer 320 are both half-duplex, the interface or communication between them is seamless—when the link layer is in receive mode, so is the translation layer; when the translation layer is in transmit mode, so is the link layer. Furthermore, the control bus 340 is also half-duplex, enabling seamless communication between the local device and the half duplex control bus. Upon detecting an incoming packet on the control bus 340, the half-duplex link layer 320 and translation layer 310 are in receive mode. In the absence of an incoming packet on the control bus 340, the half-duplex link layer 320 and translation layers 310 may operate in transmit mode to transmit a packet to the peer device over the control bus 340.

Figure 4:
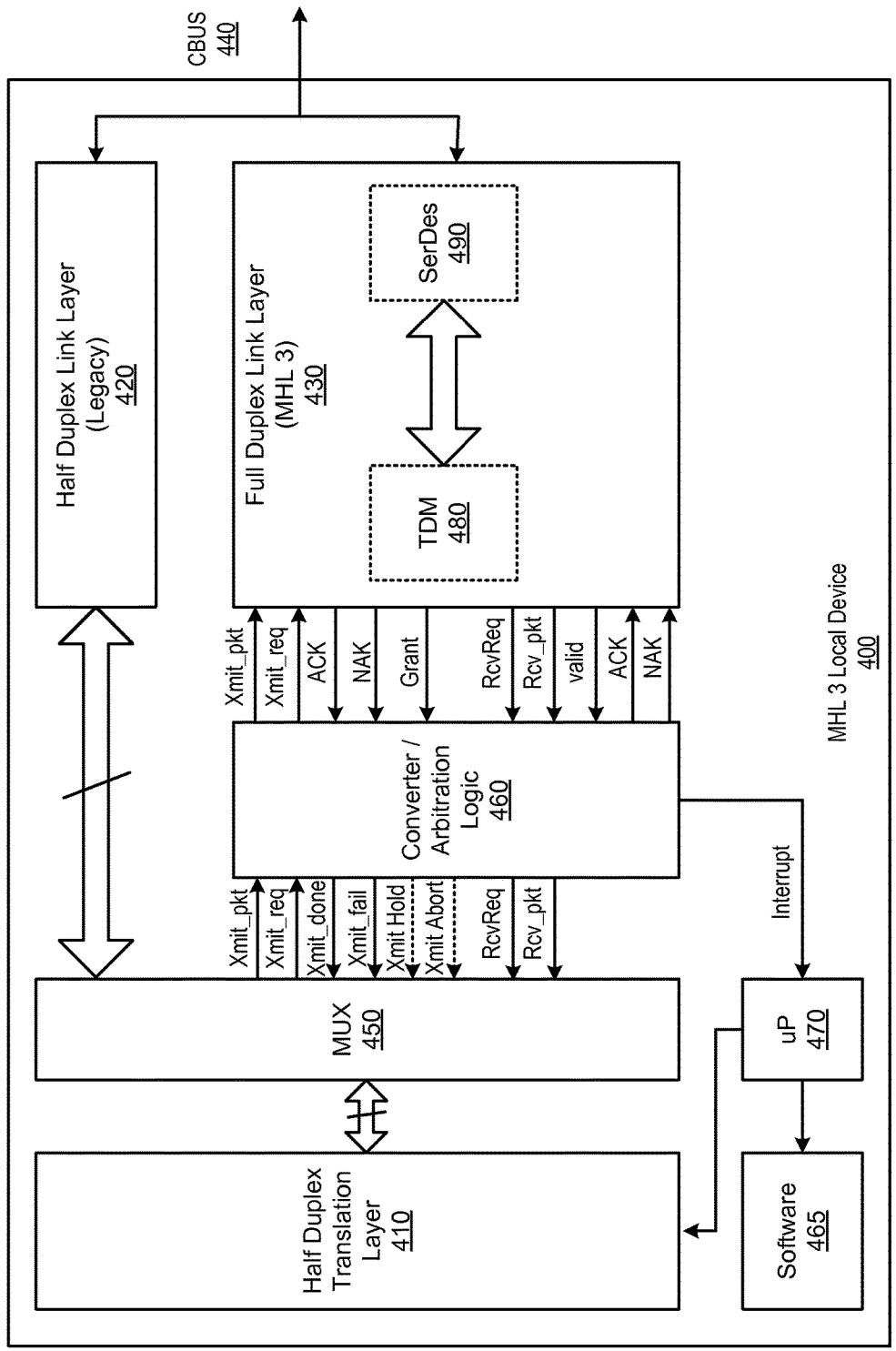
FIG. 4 illustrates a block diagram of a local MHL 3 device that has the capability to interface with both a peer legacy MHL device as well as with a peer MHL 3 device, according to some embodiments.

FIG. 4 illustrates a block diagram of a local MHL 3 device 400, according to some embodiments.

The local MHL 3 device 400 is configured to communicate with a peer MHL 3 device over an MHL 3 link. In order to preserve backwards compatibility with legacy MHL 1/2 devices, the local MHL 3 device is also configured to communicate with a peer MHL 1/2 device over a legacy MHL (MHL 1/2) link.

As explained with reference to FIG. 3, the legacy MHL (MHL 1/MHL 2) link includes a half-duplex legacy control bus (CBUS). In contrast, the MHL 3 link includes a full-duplex enhanced control bus (eCBUS). Thus, the local MHL 3 device has the capability to interface with both a half-duplex legacy control bus (CBUS) as well a full-duplex enhanced control bus (eCBUS). In other words, CBUS 440 of FIG. 4 may correspond to a half-duplex legacy control bus (CBUS) such as CBUS 340 explained with reference to FIG. 3. Alternatively, CBUS 440 may correspond to a full-duplex enhanced control bus (eCBUS).

As shown in FIG. 4, local MHL 3 device 400 comprises a half-duplex translation layer 410, a half-duplex link layer 420, a full-duplex link layer 430, a multiplexer (MUX) 450, a converter (arbitration logic) 460, software 465 and a microprocessor 470. The full duplex link layer 430 includes a time division multiplexer (TDM) 480 and serializer-deserializer (SerDes) 490.

In order to preserve backwards compatibility with legacy MHL software that interfaces with the half-duplex translation layer of the legacy MHL device (such as the legacy translation layer 310 of FIG. 3), the translation layer 410 of the local MHL 3 device is also half-duplex. Therefore, as explained with reference to FIG. 3, the half-duplex translation layer is configured to perform either of packet transmission or packet receipt at any given time, but not both concurrently.

To interface with both a half-duplex legacy control bus (CBUS) and a full-duplex enhanced control bus (eCBUS), the local MHL 3 device includes both a half-duplex link layer 420 as well as a full-duplex link layer 430. MUX 450 connects the half duplex translation layer 410 either to the half duplex link layer 420 or to the full duplex link layer 430. The half-duplex link layer 420 is selected when interfacing with a half-duplex legacy control bus (CBUS) and the full duplex link layer 430 is selected to interface with the full-duplex enhanced control bus (eCBUS). Stated differently, the multiplexing circuit (MUX 450) is configured to selectively connect the half-duplex link layer 420, or the full-duplex link layer 430 via the arbitration logic 460 to the interface of the half-duplex translation layer 410. In some embodiments, this selection is based on capabilities of a peer device connected to the control bus 440. If the peer device uses a legacy MHL (MHL 1/2) protocol, the MUX 450 selectively connects the half-duplex link layer 420 to the interface of the half-duplex translation layer 410. On the other hand, if the peer device uses an MHL 3 protocol, the MUX 450 selectively connects the full-duplex link layer 430 (via the arbitration logic 460) to the interface of the half-duplex translation layer 410.

When interfacing with the half-duplex legacy control bus (CBUS), the half-duplex link layer 420 operates in conjunction with the half-duplex translation layer in a manner analogous to that described with reference to FIG. 3.

However, when interfacing with the full-duplex enhanced control bus (eCBUS), the communication (signaling) between the full-duplex link layer 430 and the half-duplex translation layer 410 is mediated or arbitrated by converter (arbitration logic) 460. Since the enhanced control bus (eCBUS) and the full-duplex link layer 430 both have full-duplex capability, they can both support concurrent bi-directional data flow (transmission and reception). However, the translation layer 410 merely has half-duplex capability and can therefore support only either transmission or reception, but not both, at any given time. Thus, if the half-duplex translation layer 410 were directly connected to the full-duplex link layer 430, a conflict could result at the interface of the two. To resolve such conflict, to arbitrate flow, schedule sequencing, and enforce signaling rules for packet exchange between the two layers, the converter (arbitration logic) 460 is provided at the interface of the half-duplex translation layer 410 and the full-duplex link layer 430.

The half-duplex translation layer circuit 410 controls flow of control information between a local device 400 and a peer device. Specifically, the half-duplex translation layer circuit 410 generates flow control packets and control data packets that are transmitted to the link layers 420 and 430. The half-duplex translation layer 410 also receives flow control packets and control data packets from the link layers 420 and 430. The half-duplex translation layer circuit 410 only operates in half-duplex, meaning that it can either transmit or receive data through its internal communication interface to the MUX 450, but cannot do both at the same time.

The half-duplex translation layer circuit 410 can select one among several different logical data channels, such that only one logical data channel has access to the control bus 440 at a time. Examples of logical data channels in MHL include DDC (Display Data Channel) and MSC (MHL Sideband Channel). Each logical data channel follows a different flow control protocol for transfer of a different type of control information. Each logical data channel may use different flow control packets. For example, DDC may use seven different flow control packets. MSC may use eighteen different flow control packets.

The link layers 420 and 430 implement link layer protocols for sending and receiving data between the local and peer devices across the CBUS 440. The link layer protocols specify schemes for framing translation layer data (e.g. encoding, protocol, arbitration, flow control, bit timings, packet timings) into link layer packets. For example, the link layer 430 may generate link layer packets that include 2 sync bits, 2 header bits, 1 control bit, 8 data or command bits for translation layer data, and 1 parity bit. The link layer 430 also decodes incoming packets from the CBUS 430.

Additionally, the link layer 430 controls timing and synchronization of packets transmitted across CBUS 440 using a TDM (Time Division Multiplexer) 480 and SerDes (serializer-deserializer) 490. TDM 480 divides the use of CBUS 440 into time slots, some of which are for transmitting CBUS related data and some of which are for receiving CBUS related data. SerDes 490 converts parallel data bits from the TDM 480 into serial data bits for transmission over the control bus 440, and vice versa.

Arbitration logic 460 communicatively couples the half-duplex translation layer 410 to the full-duplex link layer 430. The arbitration logic 460 mediates data exchange between the half-duplex translation layer 410 and the full-duplex link layer 430.

Various signals exchanged at the arbitration logic 460 are illustrated in FIG. 4. To initiate packet transmission to a peer device, the translation layer 410 sends a transmit request (Xmit_req) together with the packet (Xmit_pkt) to the arbitration logic 460. Arbitration logic 460, in turn, propagates the transmit request (Xmit_req) together with the packet (Xmit_pkt) to the link layer 430. When the link layer 430 is ready to handle transmission of data, it grants access (Grant) to the arbitration logic 460 and immediately propagates the packet (Xmit_pkt) to the link layer 430. The peer device may receive the transmitted packet in good (e.g., error-free) or bad (e.g., error-ridden) condition, depending on which, the local device 400 may receive (from the peer device) an acknowledgement (ACK) or a negative acknowledgement (NAK). Responsive to receiving the peer ACK or peer NAK, the arbitration logic 460 then transmits, respectively, a transmit done (Xmit_done) or a transmit fail (Xmit_fail) signal to the translation layer 410.

On the other hand, upon receiving a packet receive request (RcvReq) from a peer device, the arbitration logic determines whether the translation layer 410 is capable of supporting packet receipt. The packet receive request (RcvReq) is accompanied with a corresponding received packet (Rcv_pkt) from the link layer 430. Upon determining that the translation layer 410 is not in a transmit state, the arbitration logic 460 propagates the receive request (RcvReq) and the received packet (Rcv_pkt) to the translation layer 410.

The arbitration logic 460 may also run an error check (e.g., a CRC or cyclic redundancy check) on a received packet and return (to the link layer 430) an ACK or NAK to confirm whether the received packet did or did not pass the error check, respectively. The link layer 430 may, in turn, provide the ACK or NAK to the peer device. The arbitration logic 460 may, under the condition of error check passing, propagate the receive request (RcvReq) to the translation layer 410 along with the received packet (Rcv_pkt).

A conflict can occur in certain situations where the half duplex translation layer 410 is configured to transmit data to the peer device, and the peer device also attempts to transmit data to the local device 400 (as will be explained further with reference to FIGS. 5A-5B, 6A-6B and 7). In such situations, the arbitration logic 460 resolves conflict arising at the half-duplex translation layer 410 due to concurrent bidirectional data flow at the full-duplex link layer 430 by using transmitting either a transmit hold (Xmit Hold) signal or a transmit abort (Xmit Abort) signal to translation layer 410. For example, arbitration logic 460 uses a transmit hold (Xmit Hold) signal to resolve conflict arising from concurrently or substantially concurrently occurring transmit request (Xmit_req) and receive request (Rcv_req). As another example, arbitration logic 460 uses a transmit abort (Xmit Abort) signal to prevent a packet receive request from being propagated from the link layer 430 to the translation layer 410 when the translation layer 410 is already in a transmit state and is transmitting data, thereby preventing a conflict arising at the translation layer due to concurrent transmit and receive requests. FIGS. 5A-5B illustrate a first conflict resolution scenario where a packet transmit request and a packet receive request arrive concurrently or substantially concurrently (within a specified time interval of each other) at the arbitration logic. FIGS. 6A-6B illustrate a second conflict resolution scenario where a packet receive request arrives at a local MHL device (From a peer MHL device) during ongoing packet transmission.

As described above, the arbitration logic 460 therefore provides interface and timing rules for: (i) transmitting packets from the half-duplex translation layer to the full-duplex link layer, (ii) receiving packets via the full-duplex link layer at the half-duplex translation layer, and (iii) resolving conflict arising at the half-duplex translation layer due to bidirectional data flow at the full-duplex link layer.

Additionally, the arbitration logic 460 facilitates exception handling (as will be explained further with reference to FIG. 8) by providing functionality that prevents arbitration logic 460 from waiting for over a specified interval or wait time for one or more of the abovementioned signals. Arbitration logic 460 optionally includes a counter or timer that estimates a measure of wait time while the arbitration logic awaits a signal from the full-duplex link layer 430. When the wait time exceeds a specified threshold, the arbitration logic 460 sends an interrupt signal to microprocessor 470 which in turn signals the half duplex translation layer 410 and/or the full duplex link layer 430 and/or software 465 to reset their respective states (e.g., to an idle state, to restart the previous transmission, and so on). The Interrupt signal when provided to the microprocessor 470 potentially indicates a hardware issue or problem. Software 465 can collect diagnostic information and analyze the hardware issue at a system level to determine approaches to remedy the hardware issue.

FIGS. 5A-5B include block diagrams illustrating a first example of arbitration signaling performed at a local MHL 3 device, according to some embodiments. The arbitration signaling illustrated in FIGS. 5A-5B resolves conflict arising at the half-duplex translation layer 410 due to bidirectional data flow at the full-duplex link layer 430 arising from concurrent or substantially concurrent transmit and receive requests.

FIG. 5A illustrates a scenario where a packet transmit request (Xmit_req) and a packet receive request (RcvReq) arrive concurrently or substantially concurrently (within a specified time interval of each other) at the arbitration logic 460. Since CBUS 440 and link layer 430 are both full-duplex, they can both support bi-direction packet transfer. However, the translation layer 410 is half-duplex and can therefore only support data transfer in any one direction at a time. Thus, arbitration logic 460 mediates or resolves the conflict that arises at the translation layer 410 from the concurrent or substantially concurrent bidirectional transmit and receive requests illustrated in FIG. 5A.

As shown in FIG. 5B, responsive to detecting the conflict of FIG. 5A, arbitration logic 460 sends a transmit hold (Xmit Hold) signal to translation layer 410. Upon receiving the transmit hold, the translation layer 410 suspends (e.g., temporarily, for a specified period of time) its transmission state. In other words, when the two requests (Xmit_req and RcvReq) arrive simultaneously at the arbitration logic 460, the receive request is served first and the transmit request is temporarily ignored until packet receipt is completed. After packet receipt is completed, the arbitration logic 460 verifies or checks whether the transmit request (Xmit_req) is still asserted by the transmission layer 410. Upon determining that the transmit (Xmit_req) is still asserted, the arbitration logic 460 serves the transmit request (Xmit_req) immediately following completion of packet receipt.

FIGS. 6A-6B include block diagrams illustrating a second example of arbitration signaling performed at a local MHL 3 device to resolve conflict arising at the half-duplex translation layer due to bidirectional data flow at the full-duplex link layer. The arbitration signaling illustrated in FIGS. 6A-6B resolves conflict arising at the half-duplex translation layer 410 due to bidirectional data flow at the full-duplex link layer 430 arising from receive request received at the local device 400 during ongoing packet transmission.

FIG. 6A illustrates a scenario where a packet receive request arrives at a local MHL device (from a peer MHL device), during an ongoing packet transmission. In other words, as shown in FIG. 6A, translation layer 410 enters a packet transmission state and starts to transmit a packet (Xmit_pkt) to the arbitration logic 460. During this packet transmission state (e.g., before completion of the packet transmission state or before receiving a peer ACK or NAK), the arbitration logic 460 receives a packet receive request (RcvReq) from the link layer 430, resulting from an incoming packet from the peer device. As explained above with reference to FIG. 5A, although CBUS 440 and link layer 430 are both full-duplex and can therefore both support bi-direction packet transfer, the translation layer 410 is half-duplex and can therefore only support data transfer in any one direction at any given time. Thus, arbitration logic 460 mediates or resolves the resulting conflict.

As illustrated in FIG. 6B, responsive to detecting the conflict of FIG. 6A, arbitration logic 460 sends a transmit abort (Xmit Abort) signal to the translation layer 410. The transmit abort signal causes the translation layer 410 to cease packet transmission from the translation layer 410 to the arbitration logic 460. Additionally, the arbitration logic 460 de-asserts the transmit request to the link layer 430 (e.g., to local TDM 480 of the link layer 430) to indicate that further outgoing packet transmission would be stopped. Then, the arbitration logic services the packet receive request (RcvReq). Upon completion of packet receipt, arbitration logic 460 checks whether the transmit request (Xmit_req) is still asserted by the translation layer 410. Arbitration logic 460 may resume (e.g., restart) packet transmission responsive to whether or not the transmit request (Xmit_req) is still asserted by the transmission layer 410.

In some embodiments, the arbitration logic 460 comprises a state machine that controls the flow of data between the half-duplex translation layer and the full-duplex link layer. Accordingly, FIG. 7 includes a state transition diagram illustrating states through which the arbitration logic 460 of a local MHL 3 device 300 transitions during packet transmission, packet receipt, and during conflict arising due to bi-directional data transfer.

When the local device 400 initiates packet transmission to a peer device, the arbitration logic 460 (which is typically in 'Arbitration/Idle State' 705) receives a transmit request (Xmit_req) from the translation layer 410. Responsive to receiving the transmit request (Xmit_req), arbitration logic 460 transitions to the 'Transmit States' 710 illustrated in FIG. 7. In other words, arbitration logic 460 initiates packet transmission by entering the 'Packet Transmission State' 715 (e.g., including transmitting a header and a higher and lower byte of packet data). The local device 400 stops transmission to await a response from the peer device. During this time, the arbitration logic 460 enters a Stop Transmission state 720 where it stops transmission and awaits an ACK or NAK from the peer device. The peer device may receive the transmitted packet in good (e.g., error-free) or bad (e.g., error-ridden) condition, depending on which, the local device 400 may receive (from the peer device) an acknowledgement (Peer ACK) or a negative acknowledgement (Peer NAK). Responsive to receiving the peer ACK or peer NAK, the arbitration logic 460 enters, respectively, a 'Transmit Done' 725 or a 'Transmit Fail' 730 state. This marks the completion of the 'Transmit States' 710 and the arbitration logic 460 re-enters the 'Arbitration/Idle State' 705 where it awaits further commands from the translation layer 410 or the link layer 430.

On the other hand, upon receiving a packet or a packet receive request from a peer device, the arbitration logic 460 (which is typically in 'Arbitration/Idle State' 705) receives a packet or packet receive request (RcvReq) from the link layer 430. Responsive to receiving the transmit request (Xmit_req), arbitration logic 460 transitions to the 'Receive States' 740 illustrated in FIG. 7. Specifically, arbitration logic 460 enters a Packet Receive and CRC check 745 during which the arbitration logic 460 receives the incoming packets and runs an error check (e.g., a CRC or cyclic redundancy check) on the received packet. Responsive to the arbitration logic 460 determining that the received packet does pass the error check (CRC Good), arbitration logic 460 returns (to the link layer 430) an ACK signal by entering the 'Send ACK' state 750. On the other hand, responsive to the arbitration logic 460 determining that the received packet does not pass the error check (CRC Bad), arbitration logic 460 returns (to the link layer 430) an NAK signal by entering the 'Send NAK' state 755. This marks the completion of the 'Receive States' 740 and the arbitration logic 460 re-enters the 'Arbitration/Idle State' 705 where it awaits further commands from the translation layer 410 or the link layer 430.

When the arbitration logic 460 receives concurrent transmit and receive requests (Xmit_req+RcvReq), the arbitration logic 460 (which is typically in 'Arbitration/Idle State' 705) transitions to a 'Transmission Hold' 760 state, where arbitration logic 460 temporarily ignores a transmit request to serve the receive request by entering the 'Receive States' 740 described above. Arbitration Logic 460 may determine that the transmit and receive requests are concurrent if the arbitration logic receives the Xmit_req and the RcvReq signals within a specified time interval of each other, regardless of the order in which in the Xmit_req and the RcvReq are received. Upon completion of the 'Receive States' 740, the arbitration logic 640 returns to 'Arbitration/Idle State' 705 to verify whether the transmit request (Xmit_req) is still asserted (e.g., by the translation layer 410). Responsive to the transmit request (Xmit_req) being asserted, arbitration logic 460 enters the 'Transmit States' 710 to process or service the transmit request (Xmit_req). This conflict scenario is further explained with reference to FIGS. 5A-5B.

In the scenario where the local device 400 initiates packet transmission to a peer device and the arbitration logic 460 (which is typically in 'Arbitration/Idle State' 705) enters the 'Transmit States,' while in one or more of the 'Transmit States,' the arbitration logic may receive a packet or packet receive request (RcvReq) from the link layer 430. Responsive to receiving the packet receive request (RcvReq) while in a 'Transmit State' 710 the arbitration logic 460 enters an 'Abort Transmission' state 760 and de-asserts the transmit request to the link layer 430 (e.g., to local TDM 480 of the link layer 430) to indicate that further outgoing packet transmission would be stopped. In some embodiments, an aborted packet from 'Abort Transmission' state 760 is treated by half-duplex translator layer equivalently to a failed packet from 'Transmit Fail' 730 state. Arbitration Logic then enters the 'Transmission Hold' state 770 where arbitration logic 460 temporarily ignores transmit request from the translation layer 410 to serve the receive request by entering the 'Receive States' 740 described above. 'Transmission Hold' state 770 explicitly changes the mode of arbitration logic 460 from transmission (e.g., 'Transmit States' 710) or idle (e.g., 'Arbitration/Idle State' 705) to receiving ('Receive States' 740). As described above, upon completion of the 'Receive States' 740, the arbitration logic 640 returns to 'Arbitration/Idle State' 705 to verify whether the transmit request (Xmit_req) is still asserted (e.g., by the translation layer 410). Responsive to the transmit request (Xmit_req) being asserted, arbitration logic 460 enters the 'Transmit States' 710 to process or service the transmit request. This conflict scenario is further explained with reference to FIGS. 6A-6B.

Figure 7:
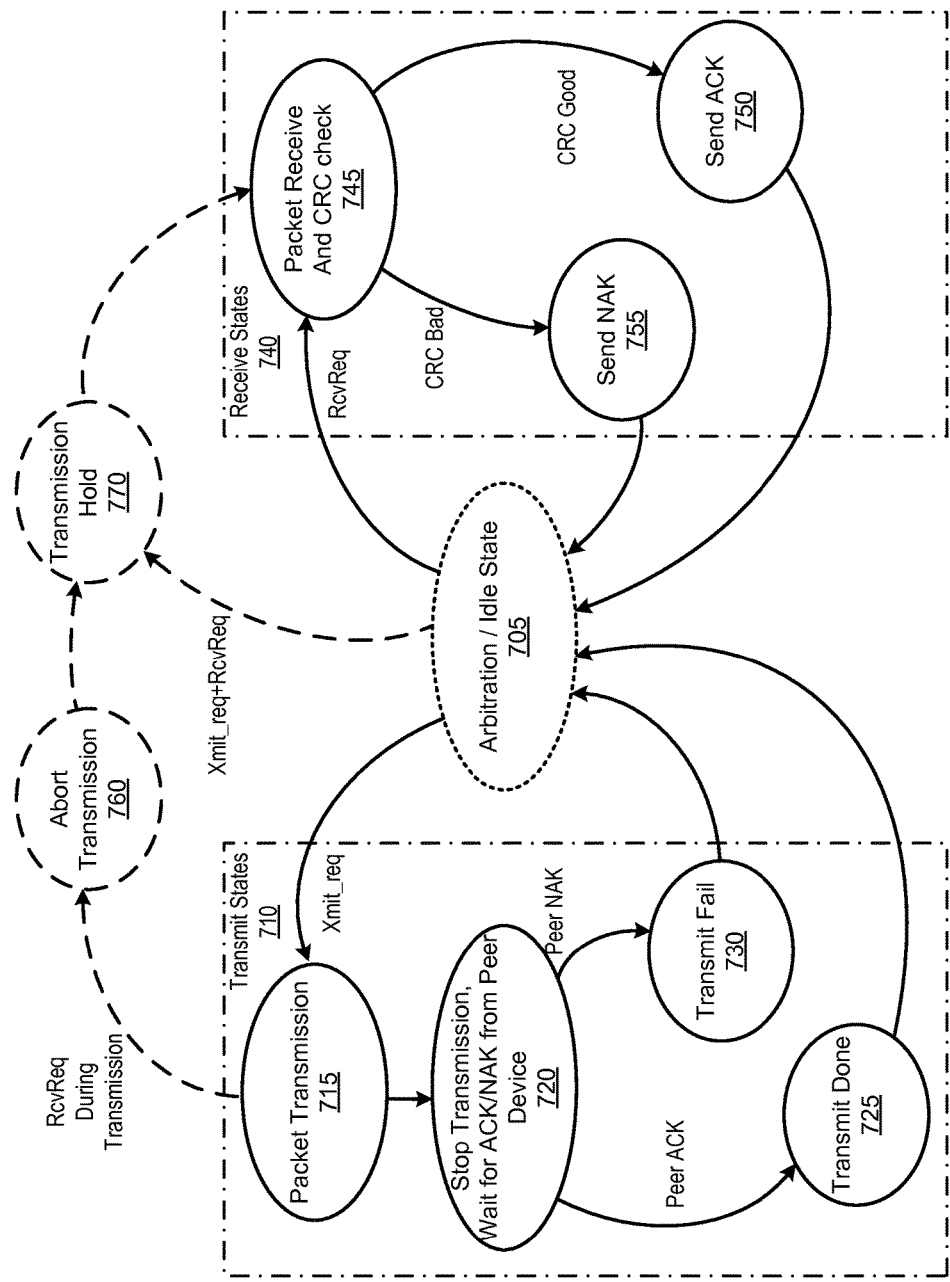
FIG. 7 includes a state diagram illustrating arbitration logic sequencing performed at a local MHL 3 device during packet transmission, packet receipt, and during conflict arising at the half-duplex translation layer due to bidirectional data flow at the full-duplex link layer, according to some embodiments.
Figure 8:
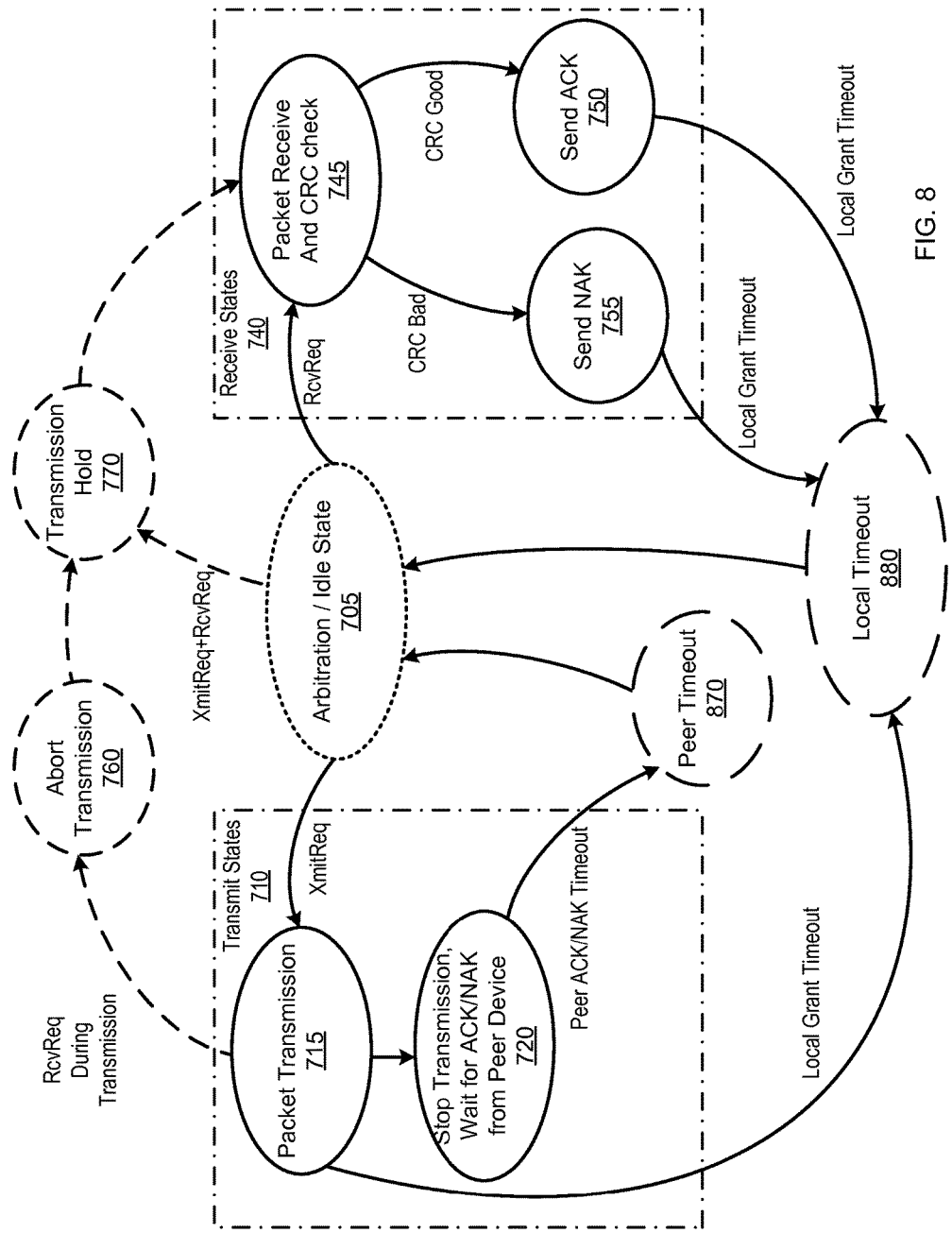
FIG. 8 includes a state diagram illustrating arbitration logic for exception handling at a local MHL 3 device, according to some embodiments.

FIG. 8 illustrates a modification of the state transition diagram of FIG. 7, to illustrate exception handling functions performed by arbitration logic 460 at a local MHL 3 device, according to some embodiments.

The transition diagram of FIG. 8 is similar to the transition diagram of FIG. 7, but with two additional Timeout states (Peer Timeout 870 and Local Timeout 880). It should be noted that states 705-770 illustrated in FIG. 8 may have one or more of the characteristics of the corresponding states 705-770 described herein with reference to FIG. 7. For brevity, these details are not repeated here.

that correspond to exception handling states indicating that the arbitration logic 460 has waited longer than a specified maximum duration of permissible wait time, for one or more ACK/NAK/Grant signals (collectively referred to herein as 'handshake' signals) from the link layer 430. These handshake signals may originate from the peer device or from within the local device itself. A duration of wait time may be measured, for example, by computing or counting a time period during which the arbitration logic 460 has awaited the one or more signals. A counter or timer may be used to compute or count the time period of wait. When the duration of wait exceeds the specified maximum duration of permissible wait, the arbitration logic 460 enters a timeout state.

In some embodiments, the arbitration logic 460 awaits ACK/NAK (handshake) signals from the peer device. For example, when the arbitration logic 460 is in the stop transmission state 720, it awaits an ACK or NAK signal from the peer device. As described with reference to FIG. 7, responsive to receiving an ACK signal from the peer device, the arbitration logic 460 progresses to a 'Transmit Done' state 725. On the other hand, responsive to receiving a NAK signal from the peer device, the arbitration logic 460 progresses to a 'Transmit Fail' state 730. However, arbitration logic 460 cannot and does not wait for an indefinite period of time to receive the Peer ACK or Peer NAK signal. Instead, a maximum time duration or an upper limit on the permissible wait time is specified for this wait. A time of wait is counted, or otherwise measured. The time of wait is compared to the maximum permissible wait time and if the time of wait exceeds the maximum permissible wait time, then the arbitration logic 460 ceases to wait for the Peer ACK or Peer NAK signals and enters a first exception handling state (in this case, a 'Peer Timeout' state 870). Stated differently, when the handshake signals expected by the arbitration logic 460 are signals originating from the peer device (e.g., the Peer ACK or Peer NAK signals), upon expiry of the specified maximum duration of permissible wait, the arbitration logic 460 enters a 'Peer Timeout' state 870. In other words, when arbitration logic 460 has waited longer than a maximum permissible wait time for peer handshake signals, the arbitration logic 460 enters a 'Peer Timeout' state 870.

Alternatively, in some embodiments, the arbitration logic 460 awaits one or more handshake signals from within the local device 400 itself. For example, during the 'Receive States' 740, upon transmitting an ACK or NAK signal to the link layer 430 indicating whether or not a received packet successfully passed an error check, the arbitration logic 460 awaits a local Grant signal from the link layer 430 as an acknowledgement of receipt of the ACK or NAK signals. Alternatively, during the 'Packet Transmission' state 715, the arbitration logic 460 awaits the local Grant signal from link layer 430 indicating that the link layer 430 is ready to handle transmission of data to the peer device. Once again, arbitration logic 460 cannot and does not wait for an indefinite period of time to receive the local Grant signal from the link layer 430. Instead, a maximum time duration or an upper limit on the permissible wait time is defined for this wait. A time of wait is counted, or otherwise measured. If the time of wait exceeds the maximum permissible duration of wait time, then the arbitration logic 460 ceases to wait for the Local Grant signal and enters a second exception handling state (in this case, a 'Local Timeout' state 880). Thus, when the handshake signals expected by the arbitration logic 460 are signals originating from within the local device 400 itself (e.g., the Local Grant signal expected during the 'Packet Transmission' state, the 'Send NAK' state, or the 'Send ACK' state as illustrated in FIG. 8), upon expiry of the specified maximum duration of permissible wait, the arbitration logic 460 enters a 'Local Timeout' state. In other words, when arbitration logic 460 has waited longer than a maximum permissible wait time for local handshake signals, the arbitration logic 460 enters a 'Local Timeout' state 880.

Note that, in some embodiments, the maximum permissible wait times specified for each of these different handshake signals may differ—a maximum permissible wait time for the Peer ACK signal, for instance, may differ from the maximum permissible wait time for the Peer NAK signal. Similarly, a maximum permissible wait time for the local Grant signal may be different from a maximum wait time for either the Peer ACK or the Peer NAK signals. These maximum permissible wait times may be predefined or programmatically modifiable. From either the 'Local Timeout' state 880 or the 'Peer Timeout' state 870, the arbitration logic 460 returns to the 'Arbitration/Idle State' 705.

As explained with reference to FIG. 4, during exception handling states ('Local Timeout' state 880 or the 'Peer Timeout' state 870) when the wait time exceeds a specified threshold, the arbitration logic 460 sends an interrupt signal to microprocessor 470 (shown in FIG. 4). The microprocessor 470, in turn, signals the half duplex translation layer 410 and/or full-duplex link layer 430 and/or software 465 (also shown in FIG. 4) to reset their respective translation layer protocol states (e.g., to an idle state, to restart the previous transmission, and so on).

Beneficially, embodiments of this disclosure permit reusability and backwards compatibility of one or more components of the legacy MHL device when interfacing with an enhanced MHL device via an enhanced MHL 3 link. In particular, the legacy half duplex translation layer 410 can be reused to interface with both the half duplex CBUS of a legacy MHL (MHL 1/2) link as well as with a full duplex eCBUS of the enhanced MHL (MHL 3) link. Furthermore, embodiments of the disclosure enable reusability of legacy software originally designed for compatibility with components of the legacy MHL device and legacy MHL link, with the enhanced (MHL 3) architecture. In particular, embodiments of the disclosure enable legacy MHL software to be used with both the CBUS of the legacy MHL link as well as with the eCBUS of the MHL 3 link.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the disclosure and its practical applications, to thereby enable others skilled in the art to best utilize the embodiments with various modifications as are suited to the particular use contemplated.

What is claimed is:

1. A device for interfacing with a peer device via a multimedia communication link having a multimedia bus and a control bus in full duplex or in half duplex, the device comprising:
   a half-duplex translation layer circuit to interface with software of the device in half duplex, the half-duplex translation layer circuit to exchange control data with the software and to communicatively couple to a half-duplex link layer circuit or a full duplex link layer circuit;
   the full-duplex link layer circuit to communicate the control data with the peer device over the control bus in full duplex;
   the half-duplex link layer circuit to communicate the control data with the peer device over the control bus in half duplex;
   an arbitration circuit communicatively coupled between the half-duplex translation layer circuit and the full-duplex link layer circuit, the arbitration circuit to control data flow of the control data between the half-duplex translation layer circuit and the full-duplex link layer circuit by regulating transmission requests and receive requests; and
   a multiplexing circuit communicatively coupled to the half-duplex translation layer circuit and configured to selectively connect the half-duplex link layer circuit or connect the full-duplex link layer circuit to the half-duplex translation layer circuit based on capabilities of the peer device.

2. The device of claim 1, wherein:
   the arbitration circuit receives a transmission request from the half-duplex translation layer circuit and a receive request from the full-duplex link layer circuit; and
   responsive to the transmission request and the receive request, the arbitration circuit grants the receive request and holds the transmission request until a receive transaction associated with the receive request is completed.

3. The device of claim 1, wherein:
   the arbitration circuit receives a receive request while in a data transmission state; and
   responsive to receiving the receive request while in the data transmission state, the arbitration circuit aborts the data transmission state and grants the receive request.

4. The device of claim 1, wherein, while the arbitration circuit is in a data transmission state, if the arbitration circuit fails to receive a transmission grant from the full-duplex link layer circuit within a pre-determined period of time, the arbitration circuit generates a signal causing a reset of protocol states of the half-duplex translation layer circuit or of the full-duplex link layer circuit.

5. The device of claim 1, wherein, while the arbitration circuit is in a data receiving state, if the arbitration circuit fails to receive a transmission grant from the full-duplex link layer circuit within a pre-determined period of time, the arbitration circuit generates a signal causing a reset of protocol states of the half-duplex translation layer circuit or of the full-duplex link layer circuit.

6. The device of claim 1, wherein, while the arbitration circuit is in a data transmission state, if the arbitration circuit fails to receive a handshake signal from a peer device via the full-duplex link layer circuit within a pre-determined period of time, the arbitration circuit generates a signal causing a reset of protocol states of the half-duplex translation layer circuit or of the full-duplex link layer circuit.

7. The device of claim 1, wherein the arbitration circuit comprises a state machine that controls flow of data between the half-duplex translation layer circuit and the full-duplex link layer circuit.

8. The device of claim 1, wherein the half-duplex translation layer circuit is configured to enable a single selected logical channel, of a plurality of logical channels, to access the control bus at a time.

9. The device of claim 1, wherein the full-duplex link layer circuit is configured to specify schemes for framing data received from the half-duplex translation layer circuit into link layer packets.

10. The device of claim 1, wherein the full-duplex link layer circuit comprises a time division multiplexer circuit to control timing and synchronization for packets transmitted over the control bus.

11. The device of claim 1, wherein the arbitration circuit controls data flow between the half-duplex translation layer circuit and the full-duplex link layer circuit by administering interface and signaling rules for:
   transmitting data packets from the half-duplex translation layer circuit to the full-duplex link layer circuit;
   receiving data packets via the full-duplex link layer at the half-duplex translation layer; and
   resolving conflict arising due to bidirectional data flow at the arbitration circuit.

12. A non-transitory computer-readable medium storing a representation of a device for interfacing with a peer device via a multimedia communication link having a multimedia bus and a control bus in full duplex or in half duplex, the device comprising:
   a half-duplex translation layer circuit to interface with software of the device in half duplex, the half-duplex translation layer circuit to exchange control data with the software and to communicatively couple to a half-duplex link layer circuit or a full duplex link layer circuit;
   the full-duplex link layer circuit to communicate the control data with the peer device over the control bus in full duplex;
   the half-duplex link layer circuit to communicate the control data with the peer device over the control bus in half duplex;
   an arbitration circuit communicatively coupled between the half-duplex translation layer circuit and the full-duplex link layer circuit, the arbitration circuit to control data flow of the control data between the half-duplex translation layer circuit and the full-duplex link layer circuit by regulating transmission requests and receive requests; and
   a multiplexing circuit communicatively coupled to the half-duplex translation layer circuit and configured to selectively connect the half-duplex link layer circuit or connect the full-duplex link layer circuit to the half-duplex translation layer circuit based on capabilities of the peer device.

13. The non-transitory computer-readable medium of claim 12, wherein:
   the arbitration circuit receives a transmission request from the half-duplex translation layer circuit and a receive request from the full-duplex link layer circuit; and
   responsive to the transmission request and the receive request, the arbitration circuit grants the receive request and holds the transmission request until a receive transaction associated with the receive request is completed.

14. The non-transitory computer-readable medium of claim 12, wherein:
   the arbitration circuit receives a receive request while in a data transmission state; and
   responsive to receiving the receive request while in the data transmission state, the arbitration circuit aborts the data transmission state and grants the receive request.

15. The non-transitory computer-readable medium of claim 12, wherein while the arbitration circuit is in a data transmission state, if the arbitration circuit fails to receive a transmission grant from the full-duplex link layer circuit within a pre-determined period of time, the arbitration circuit generates a signal causing a reset of protocol states of the half-duplex translation layer circuit or of the full-duplex link layer circuit.

16. The non-transitory computer-readable medium of claim 12, wherein, while the arbitration circuit is in a data receiving state, if the arbitration circuit fails to receive a transmission grant from the full-duplex link layer circuit within a pre-determined period of time, the arbitration circuit generates a signal causing a reset of protocol states of the half-duplex translation layer circuit or of the full-duplex link layer circuit.

17. The non-transitory computer-readable medium of claim 12, wherein, while the arbitration circuit is in a data transmission state, if the arbitration circuit fails to receive a handshake signal from a peer device via the full-duplex link layer circuit within a pre-determined period of time, the arbitration circuit generates a signal causing a reset of protocol states of the half-duplex translation layer circuit or of the full-duplex link layer circuit.

18. The non-transitory computer-readable medium of claim 12, wherein the arbitration circuit comprises a state machine that controls flow of data between the half-duplex translation layer circuit and the full-duplex link layer circuit.

19. The device of claim 1, further comprising:
   a first port to interface with the multimedia bus for transmission of video data over the multimedia bus to the peer device; and
   a second port to interface with the control bus for transmission of the control data over the control bus to the peer device.

20. The device of claim 1, wherein selectively connecting the half-duplex link layer circuit or connecting the full-duplex link layer circuit to the half-duplex translation layer circuit based on capabilities of the peer device comprises:
   connecting the half-duplex link layer circuit to the half-duplex translation layer circuit responsive to the peer device being configured to operate in half-duplex; and
   connecting the full-duplex link layer circuit to the half-duplex translation layer circuit responsive to the peer device being configured to operate in full-duplex.

* * * * *